Figure 1:
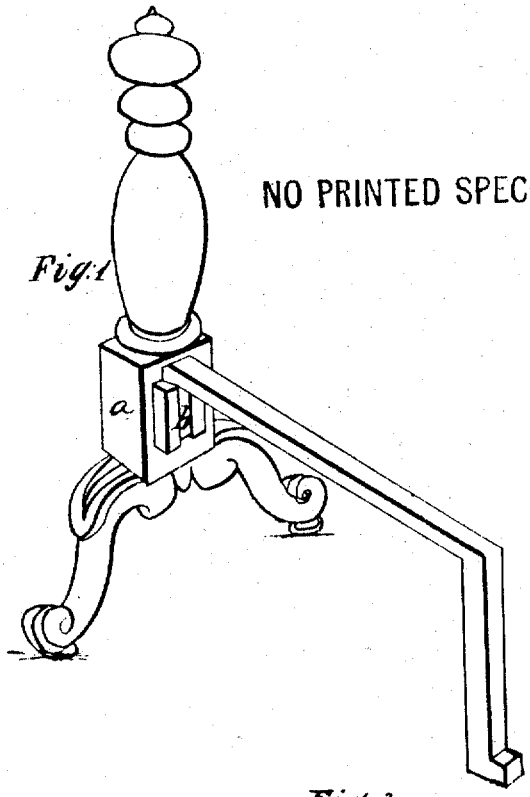
Figure 2:
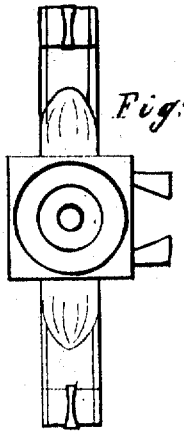
Figure 3:
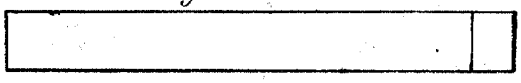
Figure 4:
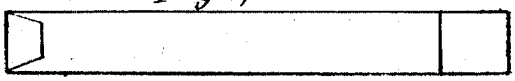
Figure 5:
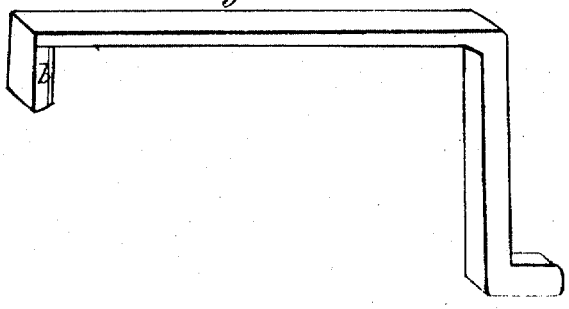

W. Wilson,

Fire Dog.

7,063 X

Patented May 16. 1832.

NO PRINTED SPECIFICATION AVAILABLE

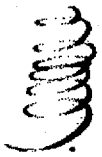

X 7063 May 16.1832

William Wilson of Greenfield and State of Massachusetts

The schedule referred to in these Letters Patent and making part of the same containing a description in the words of the said William Wilson him-self of his improvement in the manufacture & construction of the And iron.

---

Be it known, that I William Wilson of Greenfield, in the County of Frank-lin & Commonwealth of Massachusetts, have invented a new and useful improvement in the Andiron, & that the following is a full & exact descrip-tion of the construction of the said Andiron, as invented or improved by me viz. —— The improvement consists wholly in manufacturing and con-structing (of cast or wrought iron, or copper or brass) the front or upright part & the bar & foot, separate and distinct from each other, to be uni-ted by inserting the bar in the upright part by means of a Dovetail constructed upon the principle of the wedge, thus forming a complete and perfect Andiron.

Witnesses
R. C. Newcomb
Horatio G. Newcomb.

Wm. Wilson

Patented May 16th 1832.

Patent Office March 2, 1835.

I hereby Certify that the foregoing and annexed is a true Copy of Letters Patent granted to William Wilson, on the 16th day of May 1832 for his im-provement in the manufacture and construction of the Andiron. ——

J. C. Pickett
Superintendent

Compd
W.G.

(220 words)

[illegible]